(12) United States Patent
Hinds (10) Patent No.: US 8,469,649 B2
(45) Date of Patent: Jun. 25, 2013

(54) PILER RAKE AND GRAB ARRANGEMENT FOR SUGAR CANE HARVESTING

(75) Inventor: Michael Lynn Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 1446 days.

(21) Appl. No.: 11/581,858

(22) Filed: Oct. 17, 2006

(65) Prior Publication Data

US 2008/0089770 A1   Apr. 17, 2008

(51) Int. Cl.
*A01D 45/00* (2006.01)
*A01D 90/02* (2006.01)

(52) U.S. Cl.
USPC ........... 414/132; 414/739; 414/622; 414/912; 56/16.6

(58) Field of Classification Search
USPC ....... 212/243; 294/116, 67.3, 68.21; 405/232; 414/111, 132, 23, 24, 24.5, 391, 392, 442; 414/560, 618, 619, 621, 622, 722, 724, 729; 414/731, 732, 739, 740, 743; 56/16.1, 362
See application file for complete search history.

(56) References Cited

U.S. PATENT DOCUMENTS

| 117,204 | A | * | 7/1871 | Preston | 414/442 |
| 1,022,104 | A | * | 4/1912 | Miller | 414/618 |
| 2,674,380 | A | * | 4/1954 | Boudreaux | 414/132 |
| 2,833,429 | A | * | 5/1958 | Shoemaker | 414/560 |
| 2,874,854 | A | * | 2/1959 | Thornton | 414/132 |
| 3,533,525 | A | * | 10/1970 | Cancienne | 414/392 |
| 4,101,081 | A | * | 7/1978 | Ritter et al. | 241/101.74 |
| 4,614,476 | A | * | 9/1986 | Mello Ribeiro Pinto | 414/729 |
| 7,530,776 | B2 | * | 5/2009 | Hinds | 414/132 |
| 7,540,138 | B2 | * | 6/2009 | Hinds | 56/351 |

* cited by examiner

*Primary Examiner* — Gregory Adams (57) ABSTRACT

A wholestalk sugar cane loader includes a piler for accumulating wholestalk sugar cane into piles, and a grab assembly mounted to the end of a boom assembly carried by the loader frame and having opposed tines operable for encircling a mass of piled wholestale sugar cane, with the boom assembly then being operated for lifting the mass of wholestalk cane and depositing it into a container of a haul vehicle. The piler and the grab assembly have respective surface structures which cooperate, when the grab assembly is being loaded with the mass of wholestalk sugar cane, so as to aid the operator in keeping the tines of the grab assembly out of soil contact so that no soil is carried into the mass of wholestalk cane by the tines.

4 Claims, 9 Drawing Sheets

PILER RAKE AND GRAB ARRANGEMENT FOR SUGAR CANE HARVESTING

FIELD OF THE INVENTION

The present invention relates to sugar cane loaders, and, more particularly, relates to a piler and grab arrangement for such a loader.

BACKGROUND OF THE INVENTION

Most modern sugar cane loaders have some method of piling cut sugar cane stalks. The device used for this purpose is referred to as a piler. There are various types of pilers such as push pilers, chain pilers, football pilers and star pilers. These pilers all have two things in common. They all push and pile the cane and all define a pocket into which one of the pair of grab tine arrangements sweep in order for the grab to close about piled or accumulated cane stalks.

A problem associated with the known sugar cane loaders is that they all tend to cause soil to be mixed with the gathered cane stalks due to the action of the piler sliding across the ground and/or due to the action of the grab tine arrangements as they close about the piled cane. Various inventions have been tried to reduce the amount of soil being included with the sugar cane stalks being loaded. See for example U.S. Pat. Nos. 4,609,318; 4,614,476; 4,878,341; 4,962,637; 5,193,873; and 5,285,856.

SUMMARY OF THE INVENTION

According to the present invention, there is provided an improved piler and grab arrangement for a sugar cane loader.

An object of the invention is to provide a sugar cane loader having a piler and grab arrangement which operates so as to prevent the grab from engaging soil and mixing it with gathered cane stalks during loading operation.

The above object is achieved by providing the piler and grab with cooperating surfaces which effect rotation of the grab arrangement as the boom arrangement is lowered so as to keep the grab tines from soil engagement during the operation of closing the tines upon a pile of cane stalks.

The foregoing object and other objects will become apparent from a reading of the ensuing description together with the appended drawings.

DESCRIPTION OF THE PREFERRED EMBODIMENTS

Referring now to FIGS. 1-9, there is shown a sugar cane loader 10 including a loader boom arrangement 30 and a piler arrangement 70.

The sugar cane loader includes a main frame 12 supported on front and rear pairs of drive wheels 14 and 16, respectively, with the rear wheels 16 being steerable, in a well known manner (not shown). Power for driving the wheels and for operating the various hydraulic functions of the loader 10 is supplied by an internal combustion engine 18 supported on a rear region of the frame 12. Provided on a forward region of the frame 12 is an operator's cab 20 containing a seat 22 located within reach of various manually operated controls, of which only a steering wheel 24 is shown.

Figure 1:
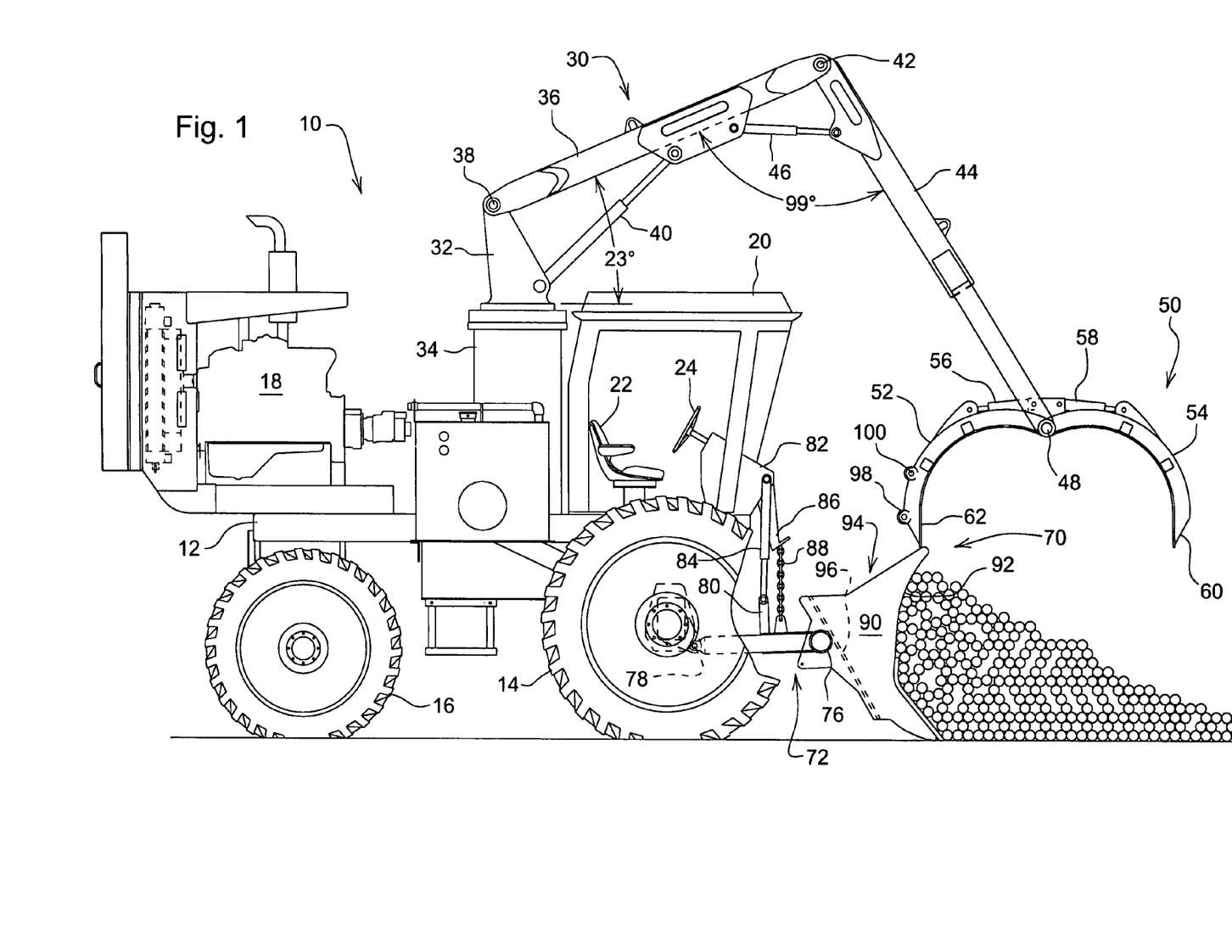
FIGS. 1-9 are right side views of a sugar cane loader respectively depicting a sequence of different positions of the boom and grab arrangements during bringing the grab arrangement into engagement with a cane stalk pile created by the piler.
Figure 9:
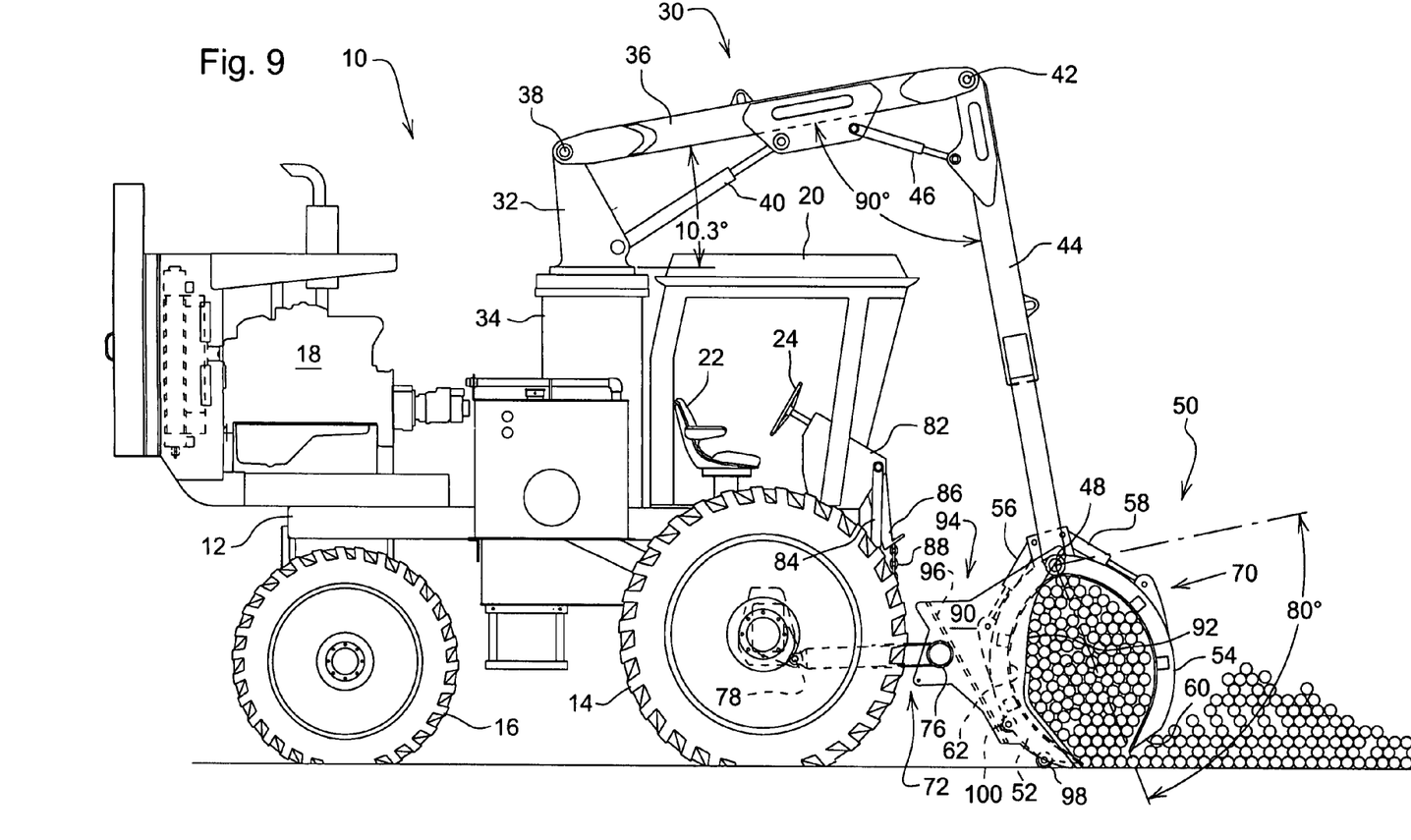

The loader boom arrangement 30 is mounted at a central region of the main frame 12, just to the rear of the cab 20. The loader boom arrangement 30 includes an upright mast 32 mounted to a pedestal 34 for being selectively rotated about a vertical axis, in a manner well known in the art. An inner boom 36 has a first end pivotally coupled, by a horizontal pivot arrangement 38, to an upper end of the mast 32 for being swung vertically by a first extensible and retractable hydraulic boom cylinder 40. The inner boom 36 has a second end pivotally coupled, by a horizontal pivot arrangement 42, to a first end of an outer boom 44, and a second extensible and retractable hydraulic boom cylinder 46 is coupled between the inner and outer booms 36 and 44 for pivoting the outer boom 44 about the pivot arrangement 42. Pivotally mounted to a second end of the outer boom 46, by a horizontal pivot arrangement 48, is a grab assembly 50 including, as viewed in the drawings, a curved rear grab tine 52 and a curved front grab tine 54. A cylinder mounting bracket (not shown) is carried on the pivot arrangement 48. Mounted between the cylinder mounting bracket and the rear grab tine 52 is an extensible and retractable hydraulic rear grab tine cylinder 56, and mounted between the bracket 50 and the front grab tine 48 is an extensible and retractable hydraulic front grab tine cylinder 58. The grab tine cylinders 56 and 58 are selectively operated in concert so as to open the grab assembly 50, when the cylinders are retracted, as shown in FIG. 1, for example, and to close the grab assembly 50, when the cylinders are extended, as shown in FIG. 9, for example. The front grab tine 54 includes opposite sides which terminate in tine end sections 60 located for straddling an end section 62 of the rear grab tine 46 when the grab tine assembly 50 is completely closed, with the end sections 60 and 62 then overlapping.

The piler arrangement 70 includes a rearwardly opening U-shaped frame 72 including a pair of transversely spaced arms 74 joined at their forward ends to a cross member 76 and having rear ends pivotally mounted to a lower front region of the main frame 12 for swinging vertically about a horizontal axis defined by respective horizontal pivot assemblies 78. A pair of upstanding brackets 80 are respectively joined to the pair of arms 74, and coupled between each bracket 80 and one of a pair of brackets 82 joined to the main frame 12, is an extensible and retractable, hydraulic piler lift cylinder 84. Formed at a lower end of each of the brackets 82 is a chain mounting bracket 86 containing a key hole shaped opening receiving a chain 88 having an end fixed to the cross member 76 of the piler frame 72, with a selected link of the chain being placed in the smaller section of the key hole shaped opening, whereby the chain 88 serves as a down stop for preventing the piler arrangement 70 from being lowered to the extent that it digs into the soil. The piler arrangement 72 includes a plurality of transversely spaced, vertical push plates 90 having rear portions joined to the frame cross member 74 and having generally C-shaped forward edges 92 adapted for engaging cut cane stalks lying on the ground and causing them to be pushed into a pile, as the loader 10 is driven forward. An adjacent pair of the push plates 90, which are located so as to be disposed centrally relative to a pile of cane stalks pushed up by the piler arrangement 70 are spaced from each other by a distance slightly greater than the width of the grab assembly 50. No structure is coupled between these adjacent push plates 90 in a zone extending forward from the cross member 76 to the forward edges 92 so that a piler pocket 94 is formed that is substantially free of cane stalks and through which the rear grab tine 52 may pass during grabbing piled cane stalks.

Up to this point, the structure described is conventional. Joining rear regions of the adjacent push plates 90, which form the piler pocket 94, and forming part of the present invention, is a downwardly and forwardly inclined guide plate 96, which engages a front region of the cross member 76. Also forming part of the present invention are horizontal first and second rollers 98 and 100, respectively, coupled to a back side of the rear grapple tine 52 in a region which constitutes approximately the lower third of a length dimension of the tine 52, with the first roller 98 being located near a bottom end of the tine 52 and the second roller 100 being spaced above the roller 98.

In operation, the piler arrangement 70 is lowered to a working height, as shown in FIG. 1, and the loader 10 is advanced forwardly along a windrow of cane stalks which have been cut and laid generally crosswise to a cane row or cane rows from which the cane stalks have been cut. The forward edges 92 of the push plates 90 contact the cane stalks and cause them to be pushed into a pile. Once a pile has been formed, as shown in FIG. 1, for example, the grab assembly 50 is opened fully, by completely retracting the actuators 56 and 58, and positioned with the rear and front tines 52 and 54 arranged in fore-and-aft alignment with each other and with the piler pocket 94. Because the grab assembly 50 hangs free at the pivot arrangement 48, the lower ends of the tines 52 and 54 are disposed approximately at a horizontal plane. With the illustrated loader 10, the initial positioning of the grab assembly 50 is accomplished by operating the first boom cylinder 40 so as to lower the inner boom 36 to an angle of about 23° to the horizontal and by operating the second boom cylinder 46 so as to dispose the outer boom 44 such that it makes an angle of approximately 99° with the inner boom 36. A seated operator can easily see when the lower end of the rear grab tine 52 is adjacent an upper, forward end of the piler push plates 90, which is the proper initial position of the grab assembly 50.

Figure 2:
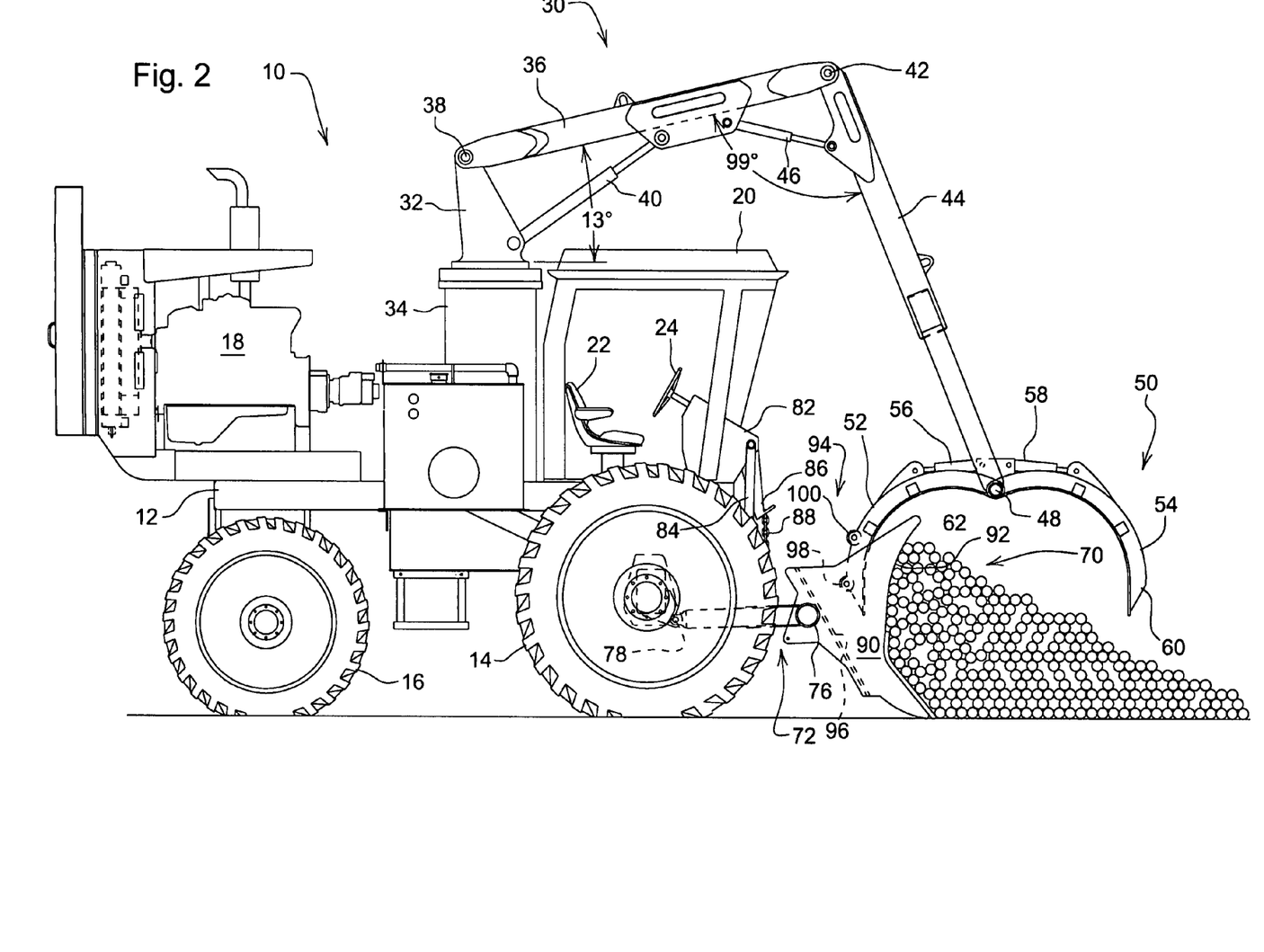
Figure 3:
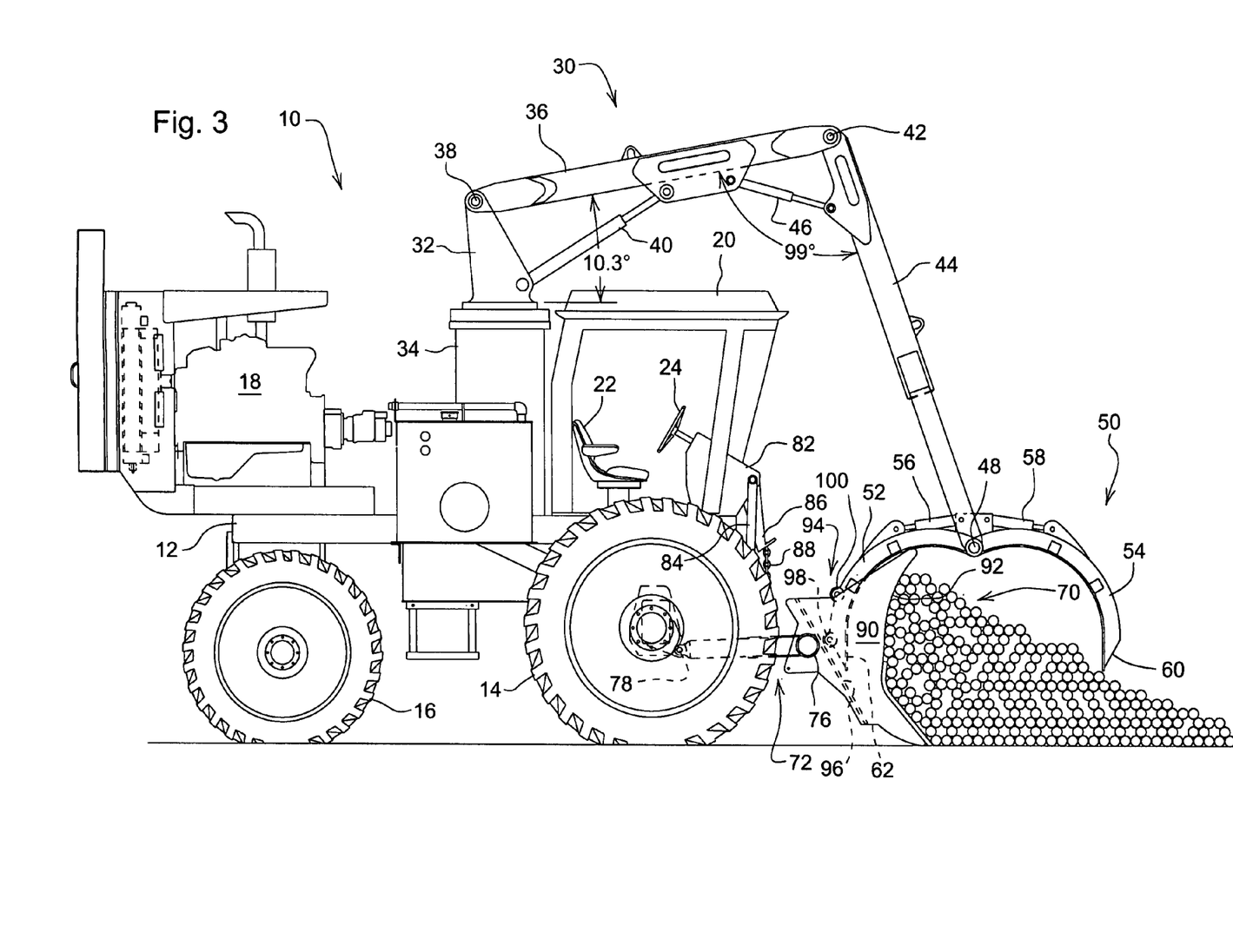
Figure 4:
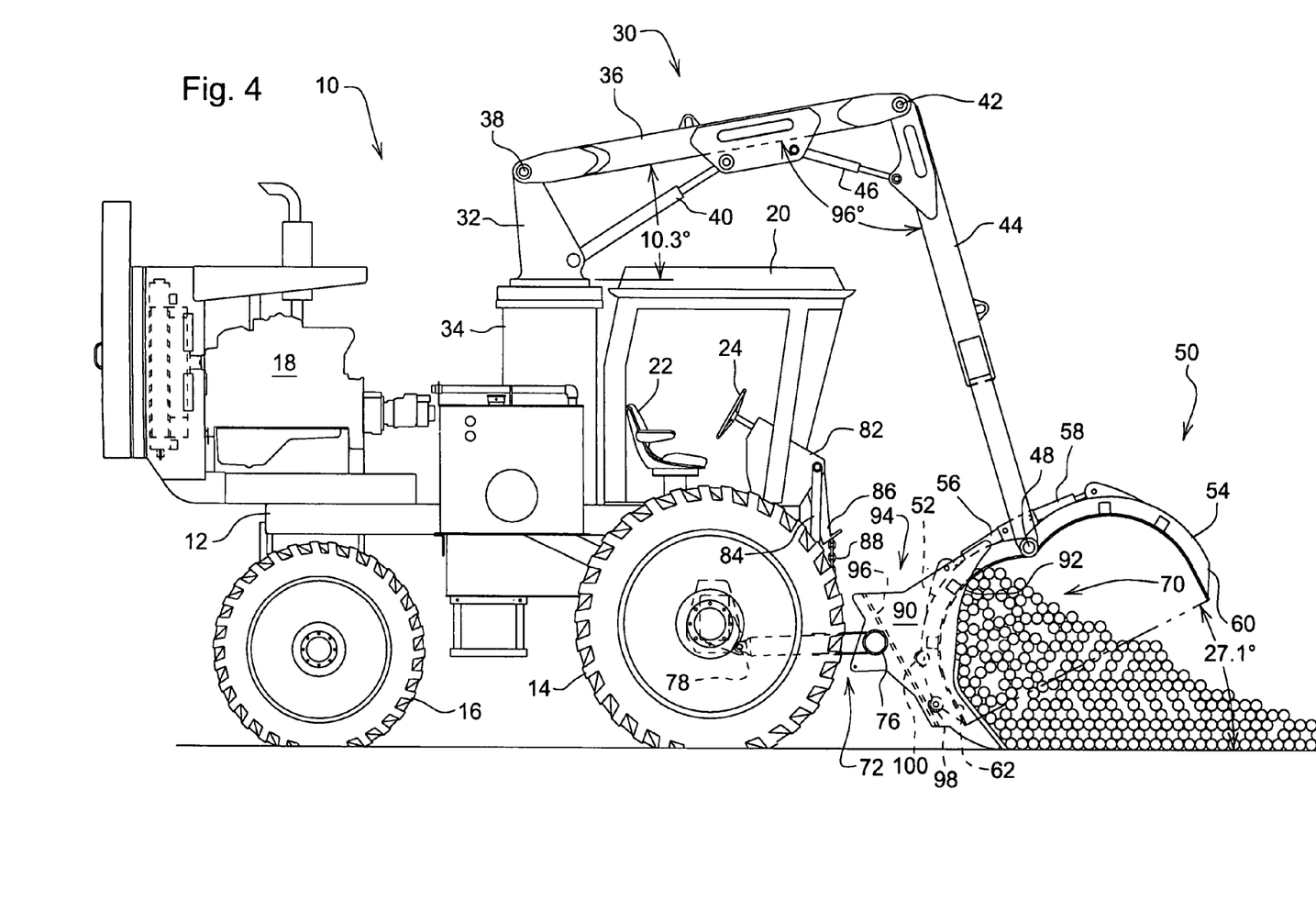
Figure 5:
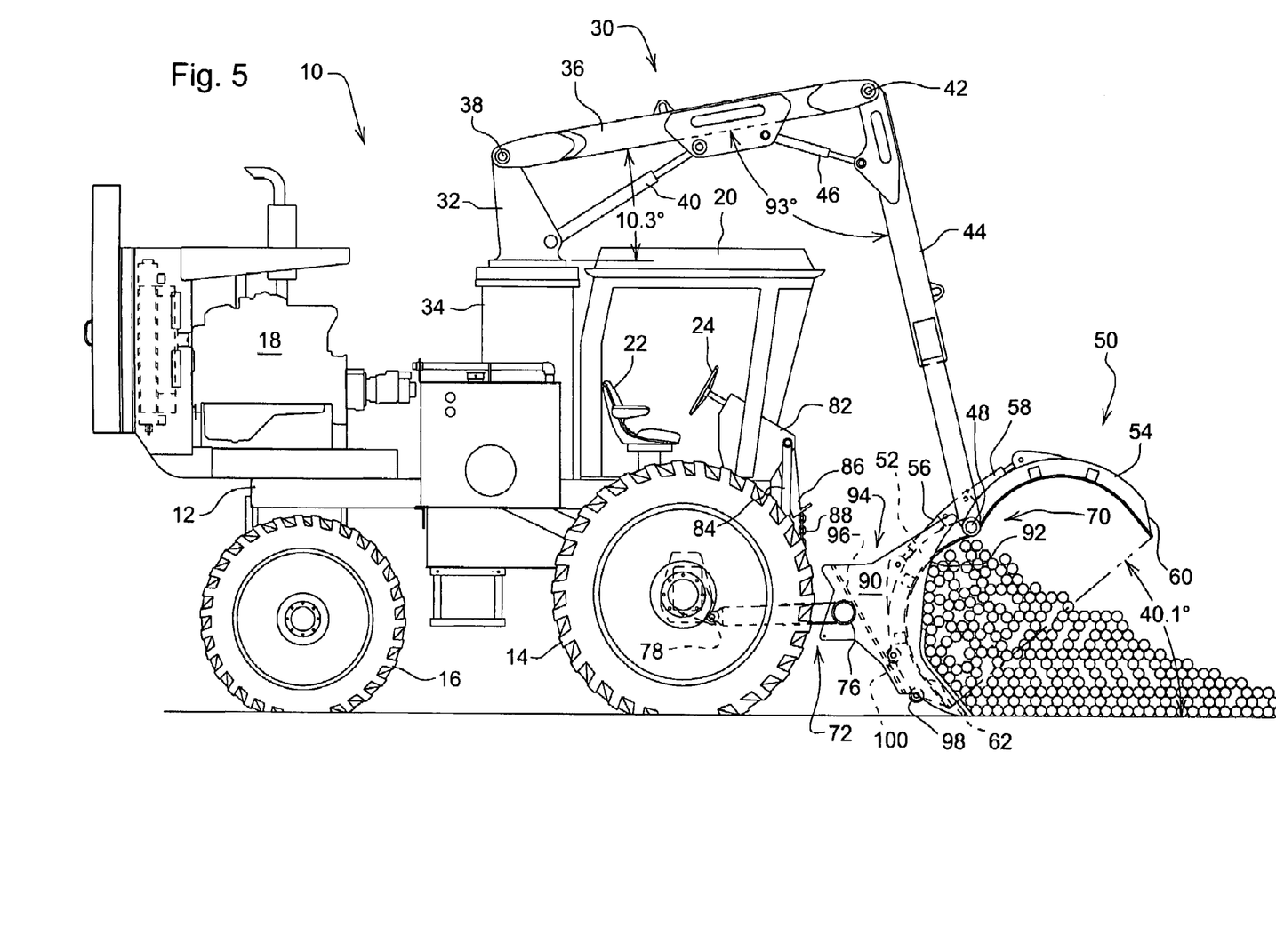
Figure 6:
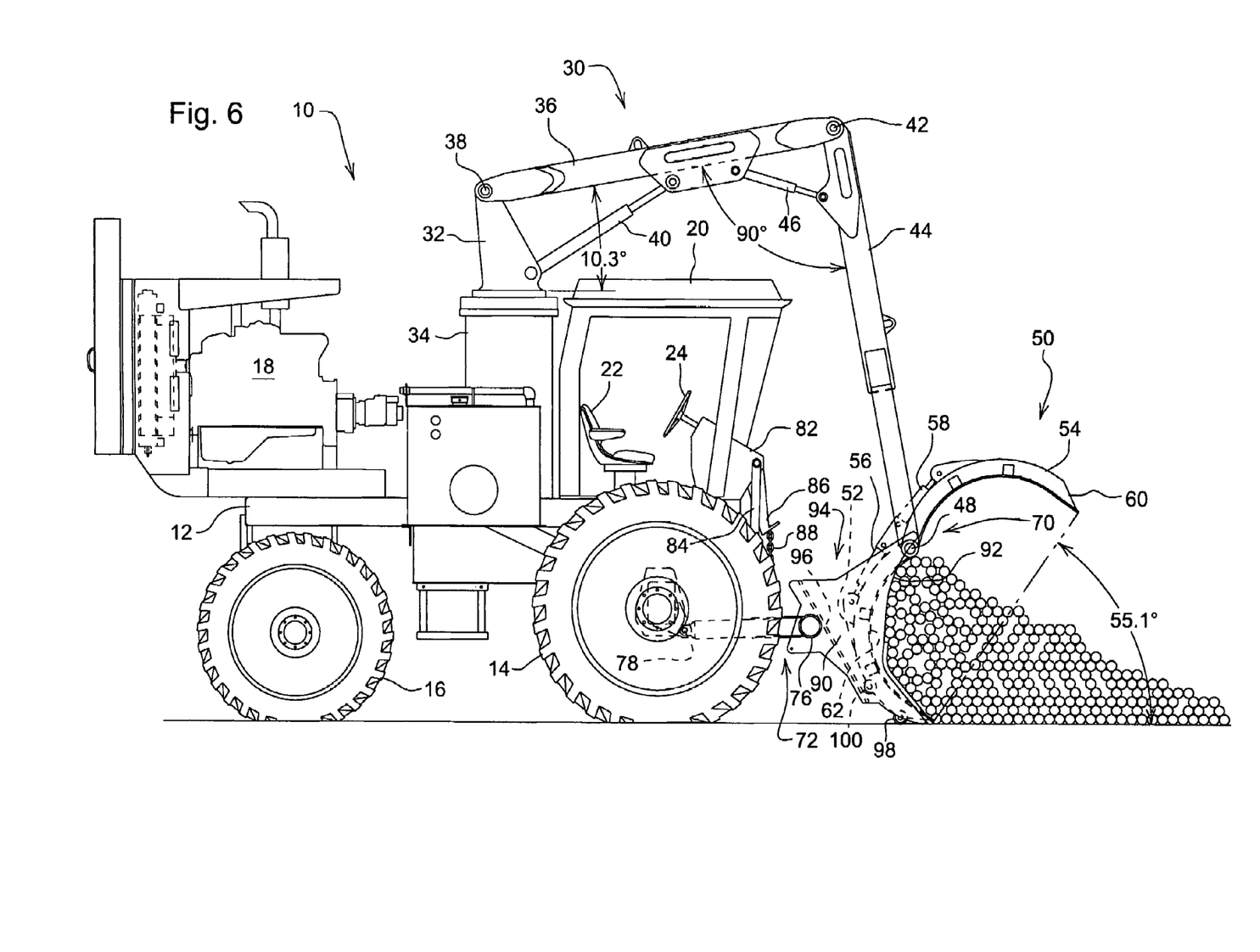

Referring now to FIG. 2, the next step in the operation is to lower the inner boom 36 by about 10°, which causes the rear tine 52 to enter the piler pocket 94. Proceeding to FIG. 3, the next step is to lower the inner boom 36 yet a few more degrees which brings the lower roller 98, carried at a lower rear region of the rear tine 52, into contact with the guide plate 96. The force imposed on the roller 98, as the boom 36 is lowered, causes the grab assembly 50 to start rotating clockwise, or forwardly, about the pivot arrangement 48. As soon as the operator sees the grab assembly 50 start to undergo this clockwise rotation, further lowering of the inner boom 36 is immediately stopped. The operator then causes the outer boom 44 to pivot to the rear about the pivot arrangement 42 by controlling the second boom cylinder 46 so that it contracts, with the interaction between the lower roller 98 and the guide plate 96 then being such that the reaction force is directed below the pivot arrangement 48 so as to cause the grab assembly 50 to rotate approximately 27° counterclockwise, or rearwardly, about the pivot arrangement 48 in response to the outer boom 44 being pivoted approximately 3° to the rear, as shown in FIG. 4. Going on to FIG. 5, the operator continues to lower the outer boom 44 by continuing to pivot it to the rear about the pivot arrangement 42 through approximately another 3°, this resulting in the grab assembly 50 undergoing approximately 17° of additional counterclockwise rotation about the pivot arrangement 48, which results in the lower roller 98 rolling off the bottom of the guide plate 96 and the upper roller 100 coming into engagement with the guide plate 96. The operator continues lowering the outer boom 44 by operation of the second boom cylinder 46 to effect rearward rotation of the outer boom 44 about the pivot arrangement 42 through another 3° increment, as shown in FIG. 6, which causes the grab assembly 50 to undergo approximately another 15° of counterclockwise rotation, with this lowering of the boom 44 resulting in the lower roller 98 coming into ground contact and in the lower end of the rear tine 52 being disposed approximately at ground level. At this point, the second boom cylinder 46 is fully retracted making it unnecessary for the operator to guess where to stop lowering the outer boom 44.

Figure 7:
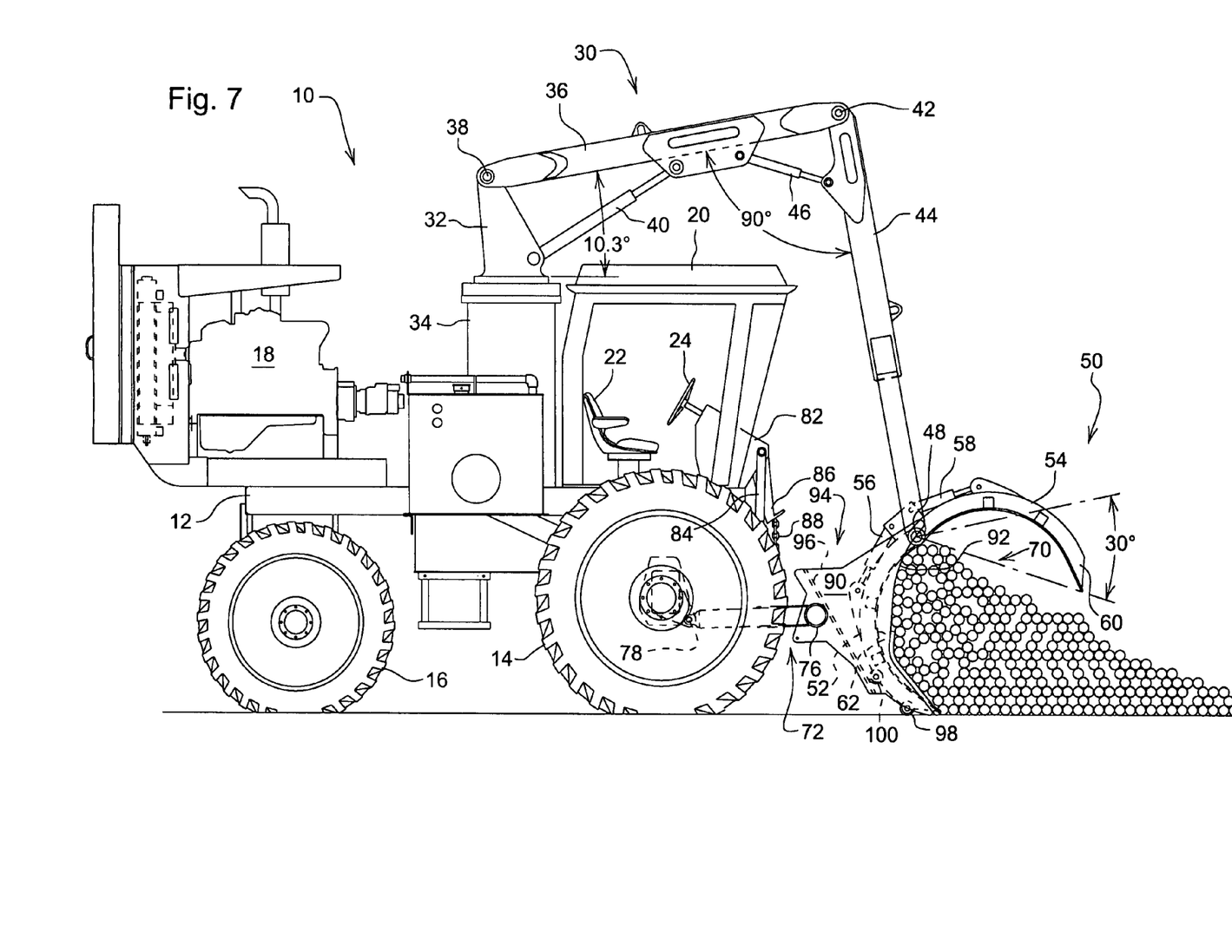
Figure 8:
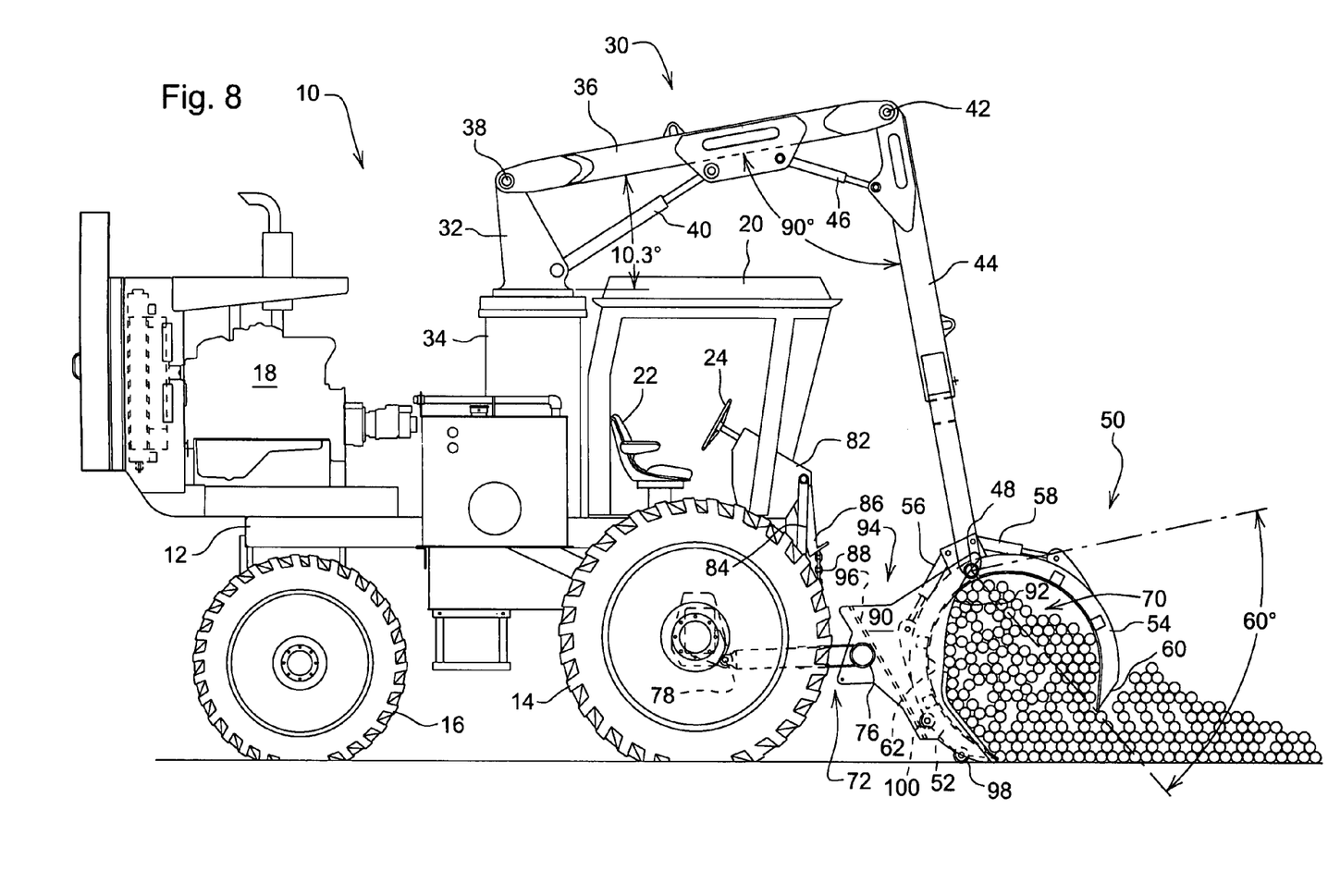

Once the lower roller 98 is resting on the ground, the front grab assembly 50 is closed by operating hydraulic controls so as to route pressure fluid for effecting the extension of the tine cylinders 56 and 58, as shown by the sequence of positions illustrated in FIGS. 7-9. It will be appreciated that during this closing operation neither of the grab tines 52 or 54 come into ground contact. Therefore, no soil will be mixed with the piled cane stalks due to the operation of the grab assembly 50.

Once the tines 52 and 54 are closed sufficiently for the grab assembly 50 to hold a gripped mass of the piled cane stalks, the booms 36 and 44 are raised by extending the cylinders 40 and 46, and the mast 32 is rotated so as to dispose the loaded grab assembly 50 over a mobile container (not shown) for hauling cane stalks. The tine cylinder 58 is then contracted so as to open the tine 54 and release the gripped mass of cane stalks into the mobile container. The operator then drives the loader 10 ahead so as to pile more cane stalks while once again lowering and swiveling the boom assembly 30 so as to position the grab assembly 50 for picking up the piled cane stalks.

While the planar guide plate 96 of the piler arrangement 94 and the rollers 98 and 100 of the rear grab tine 52 are preferred interacting parts of the piler and grab tine for causing a desired rotation of the grab assembly 50 for orienting the grab assembly for being closed upon a pile of cane stalks without the tines of the grab assembly coming into contact with the soil, the guide plate 96 could take other shapes, and, in lieu of using rollers, the back side of the rear grab tine 52 could be shaped for cooperating with the guide plate so as to create the desired rotation of the grab assembly 50 during loading it with piled cane stalks.

Having described the preferred embodiment, it will become apparent that various modifications can be made without departing from the scope of the invention as defined in the accompanying claims.

The invention claimed is:

1. In a mobile wholestalk sugar cane loader including a main frame, a piler arrangement mounted at a forward region of said main frame for vertical movement between a raised transport position and a lowered piling position and including a piler frame having a cross member extending transversely to a forward direction of travel of said loader; a plurality of transversely spaced, vertical per plates being respectively fixed at transversely spaced locations of said cross member, with said piler plates each having a generally C-shaped forward edge, whereby the piler plates, when the piler arrangement is in its piling position, create a pile of out sugar cane stalks as the loader moves forwardly along a windrow of cane stalks, with two adjacent per plates cooperating with each other so as to define a forwardly opening piler pocket between them, and a boom assembly including an inner boom having a first end coupled by a first horizontal pivot arrangement to a mast mounted to the main frame for rotating about an upright axis, an outer boom having a first end coupled by a second horizontal pivot arrangement to a second end of the inner boom, and a grab assembly including opposed, curved first and second tines, a third horizontal pivot arrangement coupling a first end of each of said first and second tines to a second end of the outer boom, and with a tine cylinder arrangement being coupled to said first and second tines for selectively effecting opening and closing of said grab assembly by respectively moving said first and second tines away and toward each other, and said piler pocket being adapted for receiving said first tine, when said first and second tines are in fore-and-aft alignment with each other and said piler pocket during loading piled cane stalks into the grab assembly, the improvement comprising: a downwardly and forwardly inclined guide plate extending between and being joined to rear regions of adjacent piler plates thereby defining a back side of said piler pocket, with said guide plate having a lower edge which is spaced above ground level by a preselected distance when the per arrangement is in its piling position; and said first tine, as considered when said grab assembly is disposed with said first and second tines in fore-and-aft alignment with each other and with said piler pocket, having a back side lower region including a rearwardly projecting first contact surface located adjacent to, and above, a lower tip of said first tine, and a rearwardly projecting second contact surface being spaced above said first contact surface by a distance greater than said distance, with said first and second contact surfaces being so configured relative to said guide plate that initial lowering of said grab assembly, when said grab assembly in an open position, so as to bring said first contact surface into engagement with said guide plate effects an initial forward rotation of said grab assembly, and subsequent lowering of said grab assembly results in said first contact surface and guide plate cooperating to effect a rearward rotation of said grab assembly until said second contact surface contacts said guide plate and said first contact surface contacts the ground and holds a lower tip of said first tine out of contact with the ground, whereby said grab assembly may thereafter be closed about a mass of said piled cane stalks without either of said first and second tines coming into ground contact.

2. The loader, as defined in claim 1, wherein said guide plate is planar.

3. The loader, as defined in claim 1, wherein said first and second contact surfaces are respectively defined by first and second rollers fixed to said back side lower region of said first tine, with said first roller being spaced above said lower tip of said first tine, and with said second roller being spaced above said first roller; and said first roller being in ground contact at a time when said second roller is in contact with said guide plate.

4. The loader, as defined in claim 3, wherein said guide plate is planar.

* * * * *